US011407010B2

(12) United States Patent
White

(10) Patent No.: US 11,407,010 B2
(45) Date of Patent: Aug. 9, 2022

(54) SORTING WASTE MATERIALS

(71) Applicant: Turbo Screen International Limited, Yaxley (GB)

(72) Inventor: Roger White, Milton (GB)

(73) Assignee: Turbo Screen International Limited, Yaxley (GB)

(*) Notice: Subject to any disclaimer, the term of this patent is extended or adjusted under 35 U.S.C. 154(b) by 0 days.

(21) Appl. No.: 17/223,862

(22) Filed: Apr. 6, 2021

(65) Prior Publication Data

US 2021/0283658 A1 Sep. 16, 2021

Related U.S. Application Data

(62) Division of application No. 16/300,165, filed as application No. PCT/GB2016/053253 on Oct. 19, 2016, now Pat. No. 11,000,881.

(30) Foreign Application Priority Data

May 17, 2016 (GB) ...................................... 1608644

(51) Int. Cl.
*B07B 13/10* (2006.01)
*B07B 1/34* (2006.01)
(Continued)

(52) U.S. Cl.
CPC ................ *B07B 1/343* (2013.01); *B03B 9/06* (2013.01); *B03B 9/065* (2013.01); *B07B 1/28* (2013.01);
(Continued)

(58) Field of Classification Search
CPC ..... B07B 2201/04; B07B 1/4609; B07B 4/08; B07B 4/04; B07B 1/55; B07B 11/08;
(Continued)

(56) References Cited

U.S. PATENT DOCUMENTS 544,043 A * 8/1895 Landis ...................... B07B 4/04
209/19
3,472,377 A * 10/1969 Payne ................... A01F 12/446
209/394

(Continued)

FOREIGN PATENT DOCUMENTS

CN 105642550 A * 6/2016
EP 0968061 B1 2/2003
(Continued)

OTHER PUBLICATIONS

Extended European Search Report, issued in EP Pat. App. No. 21159018.7, dated Jun. 28, 2021 (8 pp.).
(Continued)

*Primary Examiner* — Patrick H Mackey
(74) *Attorney, Agent, or Firm* — FisherBroyles, LLP

(57) ABSTRACT

Apparatus (200) for sorting mixed waste materials, comprising: a housing (260) configured to be vibrated to assist sorting; a screen (210) supported by the housing (260) and having an inlet end (212) for receiving waste materials and an outlet end (214) for discharging at least some waste received at the inlet end (212), the screen (210) comprising at least one portion (220) pivotally coupled adjacent the inlet end (212) to a substantially horizontal axle (222) mounted in the housing (260); and drive means (224,228) configured to pivot the at least one portion (222) of the screen (210) about the axle (222) with a controlled reciprocating action.

15 Claims, 7 Drawing Sheets

Figure 2A:
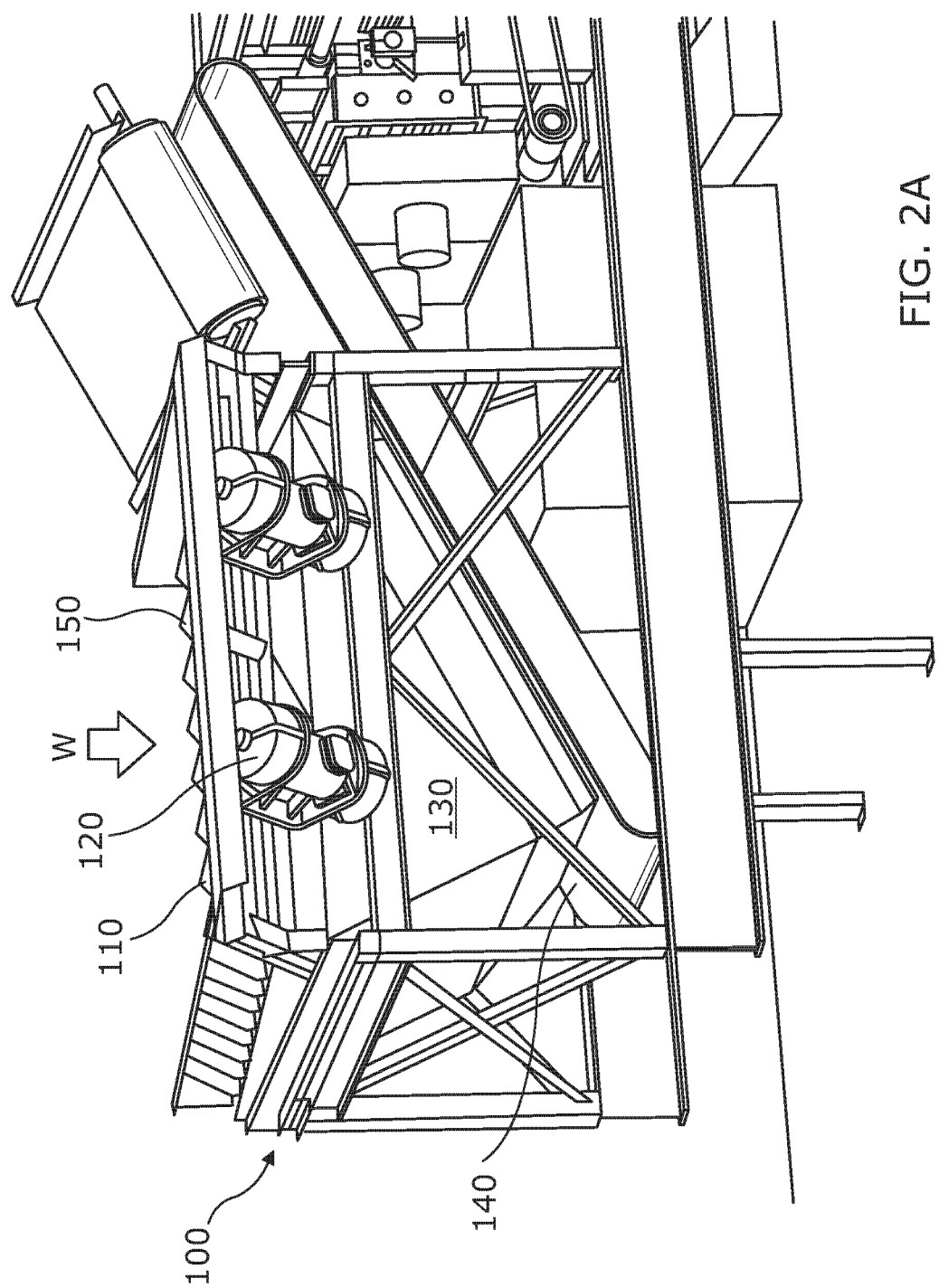

(51) Int. Cl.
*B07B 13/00* (2006.01)
*B03B 9/06* (2006.01)
*B07B 1/28* (2006.01)
*B30B 3/00* (2006.01)
*B30B 15/30* (2006.01)

(52) U.S. Cl.
CPC ............ *B07B 13/003* (2013.01); *B07B 13/10* (2013.01); *B30B 3/00* (2013.01); *B30B 15/30* (2013.01); *Y02W 30/52* (2015.05); *Y02W 30/58* (2015.05)

(58) Field of Classification Search
CPC ......... B07B 11/06; B07B 11/02; B08B 5/023; B08B 6/00
See application file for complete search history.

(56) References Cited

U.S. PATENT DOCUMENTS

| | | | |
|---|---|---|---|
| 5,626,219 A * | 5/1997 | Deefholts | B65G 15/14 198/836.2 |
| 5,795,479 A | 8/1998 | Vogt et al. | |
| 6,446,813 B1 | 9/2002 | White | |
| 6,790,137 B2 * | 9/2004 | Gorden | A01F 12/446 460/99 |
| 7,971,724 B2 * | 7/2011 | Martin | B07B 4/04 209/149 |
| 2011/0005979 A1 * | 1/2011 | Benjamins | B07B 4/08 209/235 |
| 2019/0143372 A1 | 5/2019 | White | |
| 2021/0187552 A1 * | 6/2021 | Schneider | B07B 11/06 |

FOREIGN PATENT DOCUMENTS

| | | |
|---|---|---|
| EP | 2272595 A1 | 1/2011 |
| WO | WO 1997/020643 | 6/1997 |

OTHER PUBLICATIONS

Information about Related Patents, Patent Applications, and Patent Office Proceedings see the section below having the same title.
Information Submitted in Parent Patent Applications, see MPEP 609.02 and the section below having the same title.
U.S. Appl. No. 17/223,862, filed Apr. 6, 2021, Roger White, Sorting Waste Materials.

* cited by examiner

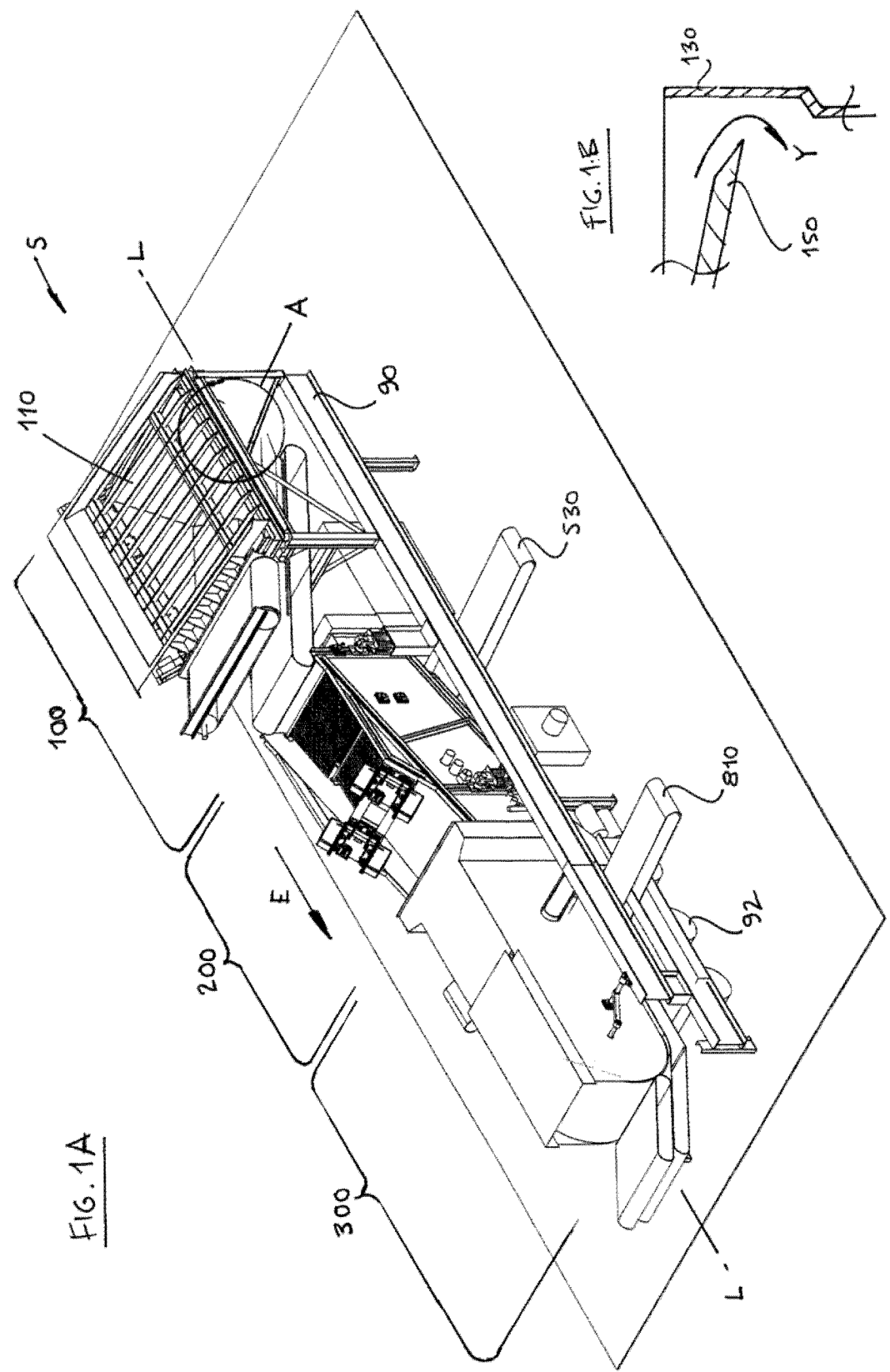

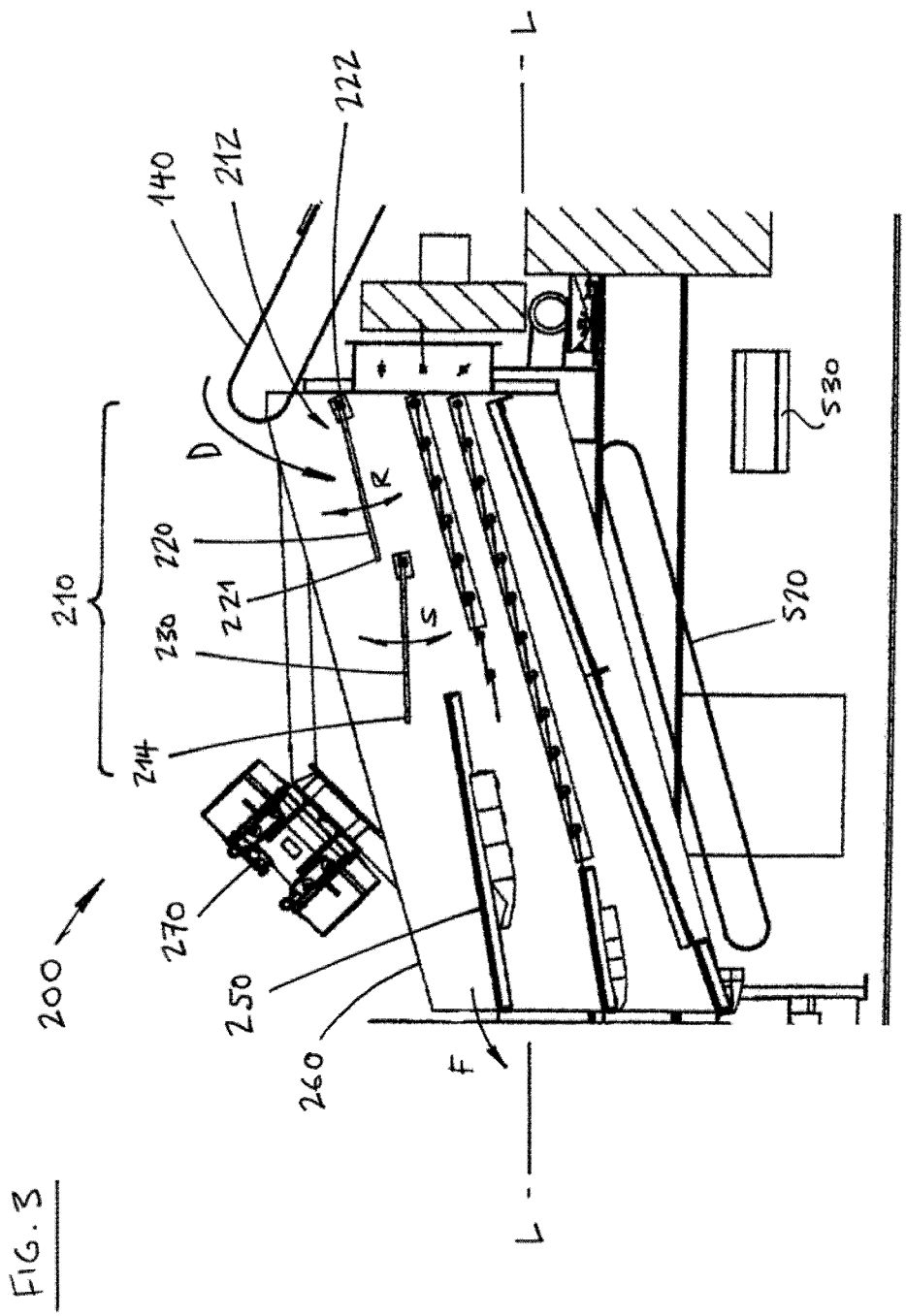

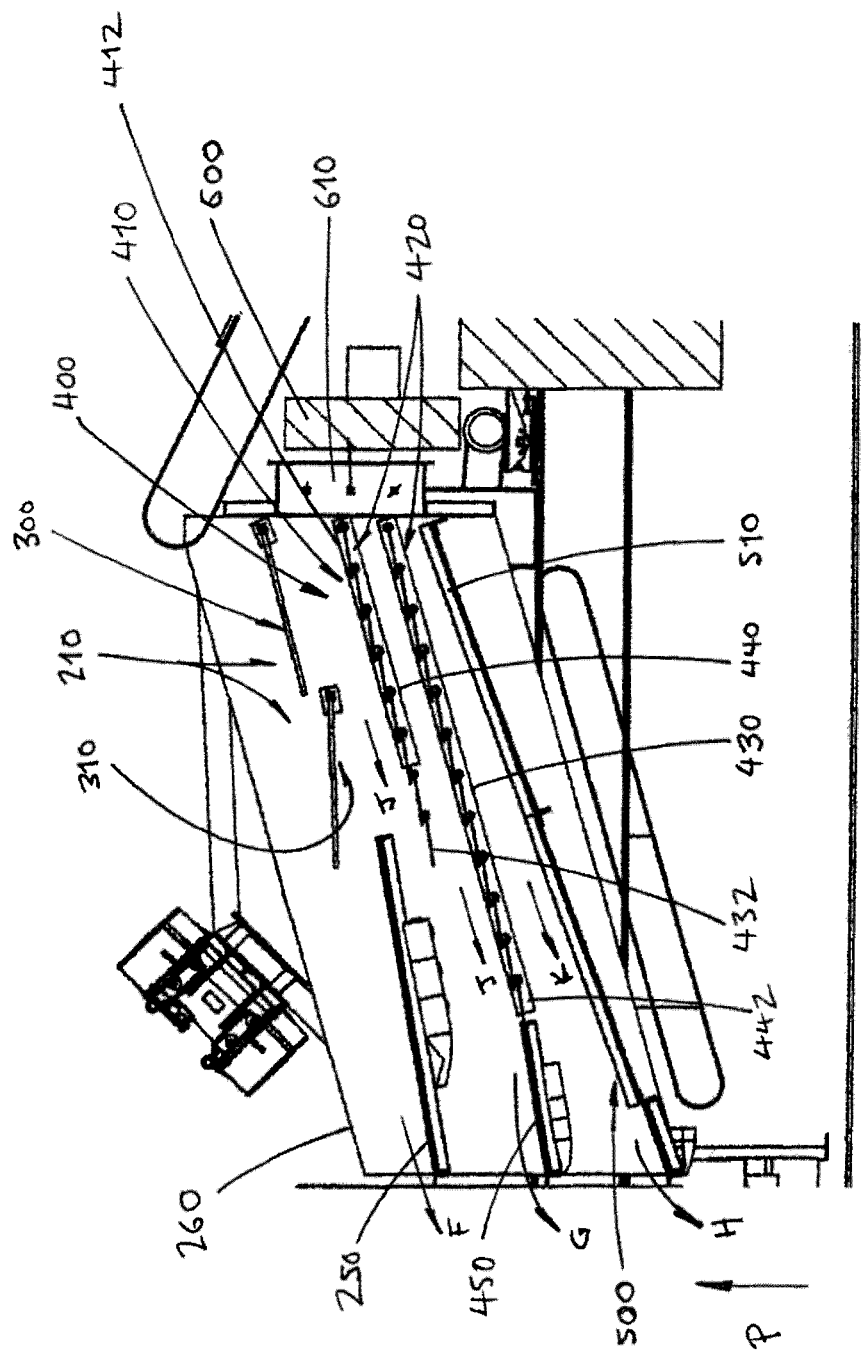

SORTING WASTE MATERIALS

TECHNICAL FIELD

The present invention relates to an apparatus for sorting mixed waste materials, and more particularly to a method and apparatus for classifying waste materials.

More particularly, but not exclusively, the invention relates to the sorting of waste materials of the kind normally encountered in skips hired for domestic use. Such waste materials often comprise a mixture of sand and soil from gardens, brick and concrete rubble from small building works, wood, scrap metal and general household refuse including paper, light plastics packaging and broken glass. Moreover, the sand and soil may be contaminated by organic compounds, in particular hydrocarbons such as engine oil. The nature of such skip waste is usually very different from that of household garbage which can be expected to be lighter in weight and to contain more wet vegetable and the like matter.

BACKGROUND ART

European patent EP 0968061 discloses apparatus for classifying waste materials comprising two sieve screens arranged one above the other. The screens are vibratably mounted in a housing, and air is blown between the screens to blow light waste material towards an outlet. In this way, the waste material is separated into a plurality of fractions with 'fine' material passing downwards through the lower screen under gravity, 'light' material being blown away from the outlet ends of the screens and 'large heavy' material falling under gravity from the outlet end of the upper screen.

The terms 'fine' and 'light' refer of course to specific surface area (hereafter 'SSA', in m2/kg), with 'fine' material having a substantially lower SSA than 'light' material. Specifically, for a given mass, 'light' material has a greater surface area and consequently a greater drag coefficient. Consequently, even though 'light' material will be subject to the downward force of gravity, the predominant force will be that exerted sideways by the blown air towards an outlet. 'Fine' material, by contrast, will have a smaller surface area and drag coefficient for a given mass with the result that, although it will be driven sideways by the blown air to some extent, it will nevertheless land on the lower screen under the force of gravity.

Similarly, the nature of the waste intended to be processed by the device of EP 0968061, specifically brick and concrete rubble from small building works, is such that 'large' items are also likely to be 'heavy', i.e., of significant mass. However, 'large' items may also be of higher SSA (e.g., in the case of cardboard sheets) and EP 0968061 also discloses an additional fan at the end of the upper vibrating screen to blow such higher SSA items sideways onto a separate conveyor, leaving lower SSA items to fall downwards under gravity.

The upper screen of EP 0968061 also has a portion configured to be agitated relatively vigorously as compared to the remainder of the screen (e.g., by being mounted with a pivot axis at one end and supported by springs at its other end). WO2009/004278 discloses a different arrangement in which the portion of the upper screen has a plurality of tines projecting away from the pivot axis to amplify flipping of waste material passing therealong.

DISCLOSURE OF INVENTION

According to a first aspect of the present invention, there is provided apparatus for sorting mixed waste materials, comprising: a housing configured to be vibrated to assist sorting; a screen supported by the housing and having an inlet end for receiving waste materials and an outlet end for discharging at least some waste received at the inlet end, the screen comprising at least one portion pivotally coupled adjacent the inlet end to a substantially horizontal axle mounted in the housing; and drive means configured to pivot the at least one portion of the screen about the axle with a controlled reciprocating action.

By virtue of the drive means, the at least one portion of the screen is actively driven to achieve a reciprocating action rather than being passively rocked by its springs as waste bounces along it. This increases the likelihood of material on the screen being 'flipped' which, in addition to the screen being subject to vibration transmitted from the housing, increases the likelihood of different material separating, thereby enhancing material classification. The drive means may be a rotary drive means, and may be configured to drive the controlled reciprocating action at a rate or frequency of at least 60 cycles per minute, perhaps even at least 100 cycles per minute, with a "cycle" referring to a full range of cyclic movement (e.g., displacement from an extreme position of the controlled reciprocating action and back thereto).

The apparatus may be configured such that a ('distal') point on the actively-driven portion of the screen that is most remote from the axle has a velocity of at least 1 m/s during the controlled reciprocating action of the screen about the axle. Such a velocity has been found to enhance the likelihood of material on that portion of the screen being 'flipped', thereby enhancing material classification. This velocity corresponds to about 200 mm (8 inch) peak-to-peak sinusoidal movement of the ('distal') tip of the actively-driven portion of a screen when reciprocated at about 100 cycles per minute.

The screen may comprise a second portion pivotally coupled to a second substantially horizontal axle and configured to be driven so as to pivot about the second axle with a controlled reciprocating action. The second portion may be adjacent the first portion, and the second axle may be substantially parallel to the first axle.

The second portion may be configured to move counter to the first portion, i.e., to move downwards when the first portion is moving upwards and vice versa.

The drive means may be configured to pivot both the first and the second portion of the screen about their respective axles with an alternating reciprocating action.

The first aspect of the present invention also provides a corresponding method of sorting mixed waste materials, the method comprising the steps of: providing a housing to assist sorting and a screen supported by the housing and having an inlet end for receiving waste materials and an outlet end for discharging at least some waste received at the inlet end, the screen comprising at least one portion pivotally coupled adjacent the inlet end to a substantially horizontal axle mounted in the housing; receiving mixed waste materials at the inlet end; vibrating the housing; and driving the at least one portion of the screen about the axle with a controlled reciprocating action.

The method aspects of the invention can be particularized using features of the apparatus described above.

Figure 6:
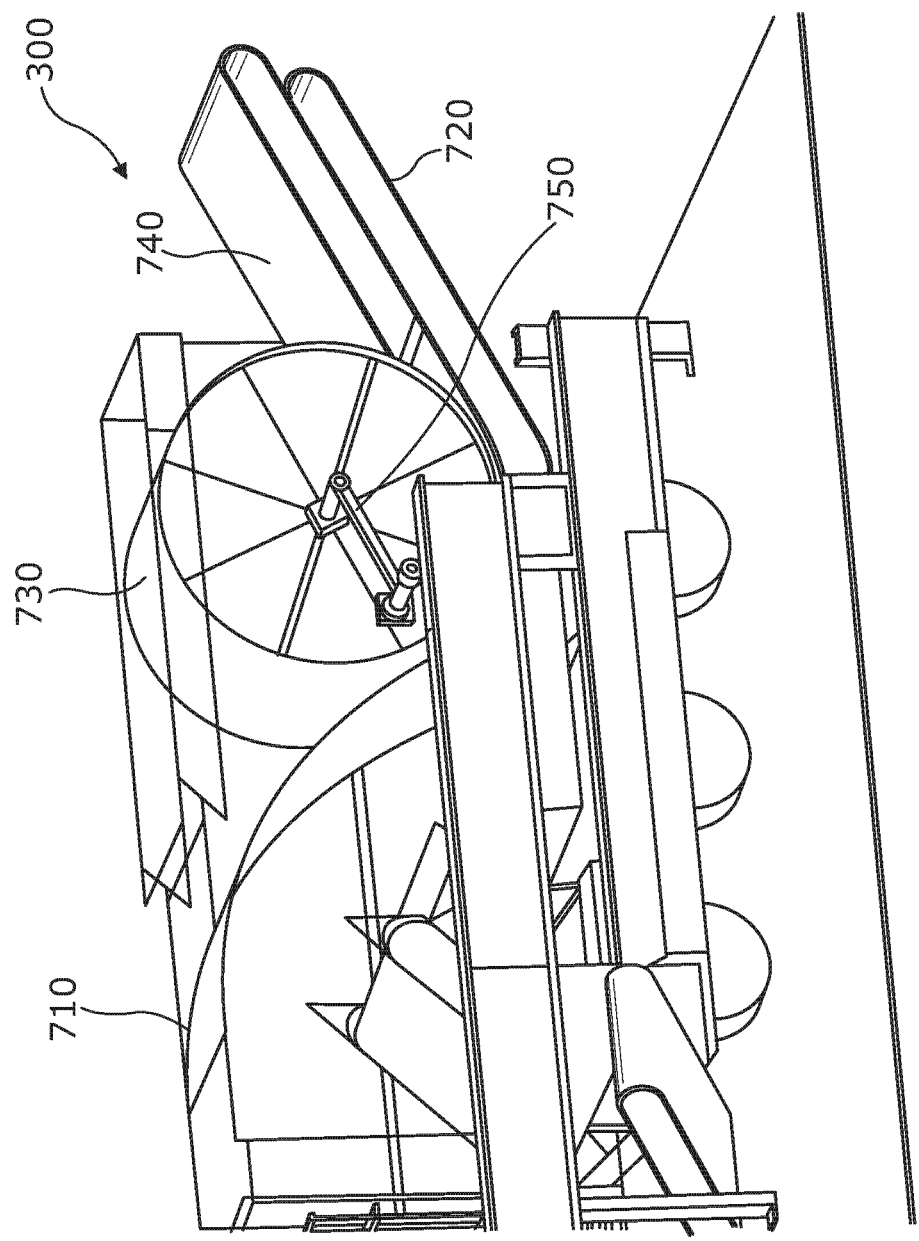

According to a second aspect of the present invention, there is provided apparatus for sorting mixed waste materials, comprising: a first sieve screen having upper and lower surfaces and first sieve openings configured to allow only particles having a maximum dimension less than or equal to a first threshold dimension to pass therethrough; a second sieve screen having upper and lower surfaces and second sieve openings configured to allow only particles having a maximum dimension less than or equal to a second threshold dimension to pass therethrough, the second threshold dimension being less than the first threshold dimension; and a third surface; wherein the apparatus is configured such that particles passing through the first screen fall under gravity towards the upper surface of the second screen and particles passing through the second screen fall under gravity towards the third surface; the apparatus being further configured to generate: a first gas stream between the lower surface of the first screen and the upper surface of the second screen and configured to drive off volatile contaminants from particles passing through the first screen, the first gas stream having a respective first velocity; and a second gas stream between the lower surface of the second screen and the third surface and configured to drive off volatile contaminants from particles passing through the 20 second screen, the second gas stream having a respective second velocity, less than the first velocity.

The present inventor has identified that a stream of gas fed between screens can be used to drive off volatile contaminants from sieved particles. In particular, a stream of air can be used to drive off organic—in particular hydrocarbon—contaminants from sieved particles of sand and/or soil.

Moreover, the inventor has recognized that the larger a particle of sand or soil leaving a sieve, the lower its SSA and the greater the velocity of sideways gas stream it can withstand before it is fully entrained in that gas stream rather than falling under the action of gravity onto the—typically further sieve screen—below.

Of course, a sieve only limits the maximum size of particles and it is likely that dust particles of the kind typically found in the brick and concrete rubble will pass through the sieve and likely be entrained in any gas flow, however low its velocity. Nevertheless, assuming that the predominant particle size leaving the sieve is determined by the size of the sieve openings, it will be the case that, the larger the sieve screen opening, the higher the velocity of gas stream that can be used to drive off contaminants from particles leaving that sieve screen.

Specifically, the first gas stream may be configured to have a first velocity such that substantially all of those particles having a maximum dimension equal to the first threshold dimension reach/land on the upper surface of the second screen (rather than being carried past the end of the second screen by the gas stream). Similarly, the second gas stream may be configured to have a second velocity such that substantially all of those particles having a maximum dimension equal to the second threshold dimension reach/land on the third surface (rather than being carried past the end of the third surface by the gas stream).

As is well known, the velocity of gas flow between two surfaces—in the present case between the lower surface of the first screen and the upper surface of the second screen or between the lower surface of the second screen and the third surface—is not uniform, being slower nearer the walls in a conduit due to the effects of friction. Accordingly, the first velocity may be the maximum velocity of the first gas stream between the lower surface of the first screen and the upper surface of the second screen. Similarly, the second velocity may be the maximum velocity of the second gas stream between the lower surface of the second screen and the third surface.

The gas is typically air and the apparatus may comprise a fan or blower configured to generate the first and second gas streams. The apparatus may include dampers to control the velocity of the first and/or second gas streams. The dampers may be mounted in a common housing.

The apparatus may be configured to simultaneously vary the velocities of both the first and the second gas stream. The apparatus may comprise a variable-speed fan located upstream of the dampers. The apparatus may be configured to vary the velocity of the gas stream leaving the fan by a factor of up to five. The velocity of the fastest gas stream may vary in a range from about 4 m/s to about 24 m/s, in particular from 4.5 m/s (10 miles per hour) to 22.5 m/s (50 miles per hour).

It will be appreciated that particles of sand and/or soil may have an SSA that is substantially lower, potentially by an order of magnitude or more, than the SSA of the paper and light plastics packaging waste referred to above. Similarly, in contrast to paper and light plastics packaging, the particles may have a maximum dimension less than or equal to 5 cm, in particular less than equal to 2 cm, most particularly less than or equal to 5 mm.

The second aspect of the invention also provides a corresponding method of sorting mixed waste materials, the method comprising the steps of: providing mixed waste materials; sieving the mixed waste materials so as to produce particles having a maximum dimension less than or equal to a first threshold dimension; thereafter passing the particles so produced through a first gas stream having a respective first velocity so as to drive off volatile contaminants; thereafter sieving the particles so as to produce particles having a maximum dimension less than or equal to a second threshold dimension; thereafter passing the particles so produced through a second gas stream having a respective second velocity, less than the first velocity, so as to drive off volatile contaminants.

The method aspects of the invention can be particularized using features of the apparatus described above. Similarly, the first aspect of the invention can be particularized using features of the second aspect and vice versa.

In both aspects multiple gas streams may be provided at the outlet of the screens to assist separation of the material.

Similarly, in both aspects, the apparatus may be configured to compact at least one fraction of sorted waste, e.g., "light" material such as plastics or cardboard packaging. The apparatus may comprise a roller configured to compact at least one fraction of sorted waste. The roller may bear upon a driven conveyor belt. The roller may be driven by the driven conveyor belt.

BRIEF DESCRIPTION OF DRAWINGS

An embodiment of the invention will now be described by way of example with reference to the accompanying drawings, in which:

FIG. 1A is a perspective view from above of apparatus, including primary, secondary and tertiary sections;

FIG. 1B is a detail sectional view on A in FIG. 1A;

FIG. 2A is a detail perspective view of the primary section of the apparatus taken from the opposite viewing direction to that of FIG. 1A;

FIG. 2B is a detail perspective view of the secondary section of the apparatus taken from the opposite viewing direction to that of FIG. 1A;

FIG. 3 is a sectional view from the opposite side of FIG. 2B and showing a first aspect of the invention;

FIG. 4 is a sectional view from the opposite side of FIG. 2B and showing a second aspect of the invention;

FIG. 5 is a sectional side view of the tertiary section of the apparatus of FIG. 1A;

FIG. 6 is a detail perspective view of the tertiary section of the apparatus taken from the opposite viewing direction to that of FIG. 1A.

DETAILED DESCRIPTION OF SPECIFIC EMBODIMENTS

Figure 2B:
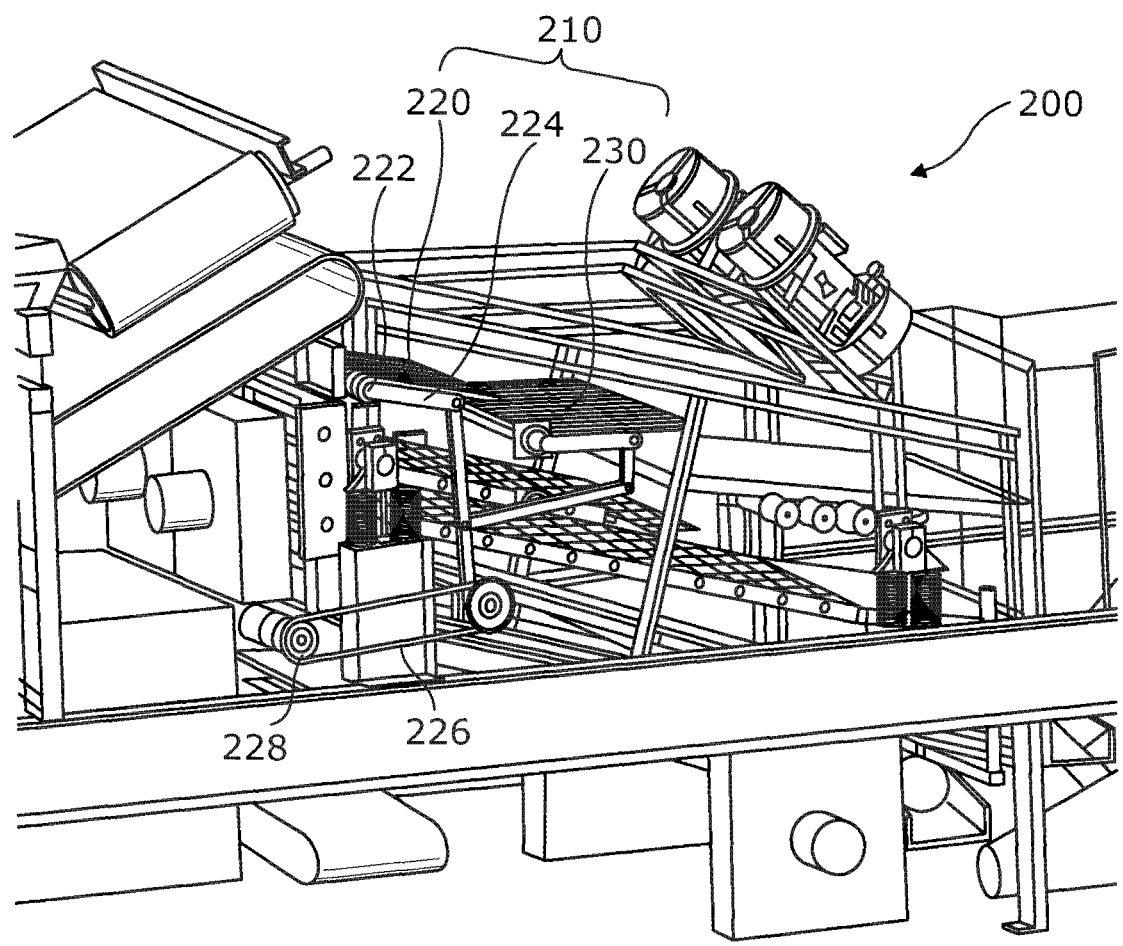

FIG. 1 is a perspective view from above of apparatus 5 for sorting mixed waste materials and comprising primary, secondary and tertiary sections 100, 200, 300 arranged successively (in a feed direction E) along the longitudinal axis LL of the apparatus. FIGS. 2A-C are, respectively, detailed perspective views of the three sections 100, 200, 300 taken from the opposite viewing direction to that of FIG. 1. Sections 100, 200, 300 are mounted on a chassis provided at one end with wheels 92 and at the other end with an articulated connection (not shown) in order that the apparatus might be moved using a conventional HGV tractor unit. It will be appreciated that the sections with their respective separating functions may be divided up in a different fashion to that shown.

As indicated by arrow W in FIG. 2A, waste is fed into the apparatus by deposition on a sloping grate 110 which is vibrated by one or more vibrators 120 attached thereto. As previously noted, the waste is of the kind normally encountered in skips hired for domestic use. Such waste materials often comprise a mixture of earth from gardens, brick and concrete rubble from small building works, wood, scrap metal and general household refuse including paper, light plastics packaging and broken glass. The waste—in particular the soil/earth—may additionally be contaminated by organic compounds, in particular hydrocarbons such as engine oil.

Small components of the waste pass straight through the vibrating grate 110 through a hopper 130 and onto a conveyor belt 140 for conveying to the next section of the apparatus. Larger components of the waste either break up under the action of the vibration and fall through the grate or move, under the action of vibration and gravity and substantially transversely to axis LL, to the lower edge 150 of the sloping grate from where they fall into the hopper 130 as indicated by arrow Y in the detail view of FIG. 1A.

FIG. 2B is a detailed perspective view of the second section 200 of the apparatus, with FIG. 3 showing a sectional view from the opposite side. Waste is carried to the top of conveyor belt 140 from where it drops, as indicated by arrow D, onto the inlet end 212 of a first screen 210 which slopes downwardly in the feed direction E to an outlet end 214 for discharging at least some waste received at the inlet end.

Screen 210 is made up of two portions 220, 230 arranged successively along the longitudinal axis LL and supported by a housing 260 to the top of which is attached two vibrators 270. The vibrators 270 vibrate the housing 250 which in turn vibrates the portions 220, 230 of the screen, thereby assisting sorting of the waste as is known per se. In an alternative embodiment, not shown, a vibration generator of the 'center shaft' kind is mounted inside the housing, albeit at the expense of obstructing air flow within the housing to a certain extent.

The first portion 220 of the screen nearest the inlet end 212 is pivotally coupled adjacent that end to a substantially horizontal axle 222 mounted in the housing 250. As indicated by arrow R, axle 222 and first screen portion are driven in controlled reciprocating motion by a linkage 224 driven by motor 228 via a belt 226. In the embodiment shown, this results in a peak-to-peak movement of that ('distal') tip 221 of the portion 220 most remote from the axle 222 of about 200 mm (8 inch) at 100 cycles per minute. Where the reciprocating motion is sinusoidal, as may result when the linkage incorporates a crank, this results in a velocity at the tip 221 of at least 1 m/s. Such a motion has been found to enhance the likelihood of material on that portion of the screen being 'flipped', which in turn helps to displace any heavy, low SSA waste (such as bricks) that may be sitting on top of other, high SSA material (such as cardboard), thereby promoting separation and material classification.

The second screen portion 230 is similarly attached to a second substantially horizontal axle 232 which is similarly driven with a controlled reciprocating action S by linkage 224. In another embodiment, not shown, two separate drive means are employed to reciprocate the two screen portions 220, 230. Moreover, linkage 224 is configured such that the second portion moves counter to the first portion, to moving downwards when the first portion is moving upwards and vice versa. Again, such motion enhances material separation and classification as the waste material moves from the inlet 212, over the first and second screens 220, 230 to the outlet 214 where any material that, despite the enhanced motion described above, has not passed through the screen portions is received onto the upper end of a slide 250. Slide is mounted in the housing 260 and accordingly vibrates which, in combination with its inclination, delivers the waste into the third section of the apparatus as indicated by arrow F.

FIG. 4 corresponds to the view of FIG. 3 and illustrates a second aspect of the invention. As discussed with regard to FIG. 3, the apparatus has a housing 260 supporting a first sieve screen 210, inclined downwards in the feed direction E and having upper and lower surfaces 300, 310 and first sieve openings configured to allow only particles having a maximum dimension less than or equal to a first threshold dimension (T1) to pass therethrough. Such openings are an inherent and well-known feature of a sieve screen and accordingly not shown in further detail.

A second sieve screen 400, again inclined downwards in the feed direction E, is also supported by the housing 260 and is located beneath the first sieve screen 210 such that particles passing through the first screen land on the upper surface 410 of the second screen. The second screen has second sieve openings configured to allow only particles having a maximum dimension less than or equal to a second threshold dimension to pass through to the lower surface 420 of the screen, the second threshold dimension (T2) being less than the first threshold dimension. Again, this is well known and accordingly not shown in further detail. The second screen is made up of first and second portions 430, 440 arranged one above the other and both inclined downwards in the feed direction E. The first, upper portion 440 is shorter than the second, lower portion 430 so that any waste material that does not pass through the first portion falls from the outlet end 432 thereof onto the second portion 430. Any material that does not pass through the second portion then falls (as indicated at G) from the outlet end 442 thereof onto a second vibrating inclined slide 450 for transfer to the tertiary section of the apparatus.

Those particles that do pass through the second screen, however, land on the upper surface 500 of a vibrating inclined slide 510 which delivers those particles to the tertiary section of the apparatus as indicated at H.

Waste flows F, G, H are then passed through multiple high-velocity vertically-directed air jets or 'knives' P as discussed in more detail below with reference to FIG. 5. Similar 'knives' (not shown) are arranged under the top plate of the screen housing 260 and at the back.

As better shown in FIG. 3, slide 510 may itself be a further screen having yet smaller sieve openings, that material passing through the further screen landing on a conveyor belt 520 from which it is deposited on to a conveyor belt 530 extending from the side of the apparatus, transversely to axis LL.

A fan 600 is located adjacent the inlet ends 212, 412 of the first and second screens 210, 400 to blow a first gas stream (indicated by arrow J) of air between the lower surface 310 of the first screen and the upper surface 410 of the second screen and a second gas stream (indicated by arrow K) of air between the lower surface 420 of the second screen and the surface 500 of slide 510.

Between the fan 600 and screens 210, 400 is further located a damper housing 610 containing first and second dampers (not shown) that respectively control/throttle the air flow from the fan 600 such that the velocity of the second gas stream K leaving the damper housing is less than that of the first gas stream J leaving the housing. Specifically, the second, lower damper may be more closed than the first, upper damper.

The two gas streams J, K drive off hydrocarbon contaminants from sand and soil particles passing through the first and second screens respectively, the velocity of the first gas stream J being chosen such that substantially all of the maximum-size particles passing through the first sieve screen 210 (of dimension T1) land on the upper surface 410 of the second screen rather than being carried past the end of the second screen by the gas stream and exhausted to ambient.

As regards those particles passing through the second sieve screen 210, the velocity of the second gas stream K is chosen such that the maximum-size particles (of dimension T2) land on the surface 500 rather than being carried past the end of that surface by the gas stream and exhausted to ambient.

As set out above, since T2 is less than T1, the velocity of the second stream is less than that of the first stream. Accordingly, the first velocity may be the maximum velocity of the first gas stream between the lower surface of the first screen and the upper surface of the second screen. As also noted above, it may be the maximum velocities of the two gas streams that are determinant.

Although only two sieve screens and two gas streams of different velocity are discussed in the embodiment above, it will be appreciated that additional screen(s) with corresponding smaller threshold dimension(s) T may be used with correspondingly lower velocity gas stream velocities.

For example, first, second, third and fourth screens may be employed with respective threshold dimensions T1=30 mm, T2=20 mm, T3=15 mm and T4=10 mm and gas flows V m/s between the lower surface of each screen and the surface below of V1>V2>V3>V4.

Moreover, in addition to a variation in velocity between gas streams, there may also be a simultaneous variation upward or downward in the velocities of all gas streams. In the embodiment shown, this is achieved by varying the speed of the fan 600 ahead of the damper housing 610 so as to vary the velocity of the air leaving the fan, potentially by a factor of up to five. This may result in the velocity of the fastest gas stream J varying in a range from about 4 m/s to about 24 m/s, in particular from 4.5 m/s (10 miles per hour) to 22.5 m/s (50 miles per hour), the velocity of the slower gas stream K varying between correspondingly lower limits. Such variability in overall gas velocity allows for overall variations in the mass of sand/soil particles resulting e.g., from variation in moisture content: wet sand/soil particles of a given size will have a higher mass and thus lower SSA than corresponding dry particles, with the result that they will accommodate a higher gas stream velocity.

Figure 5:
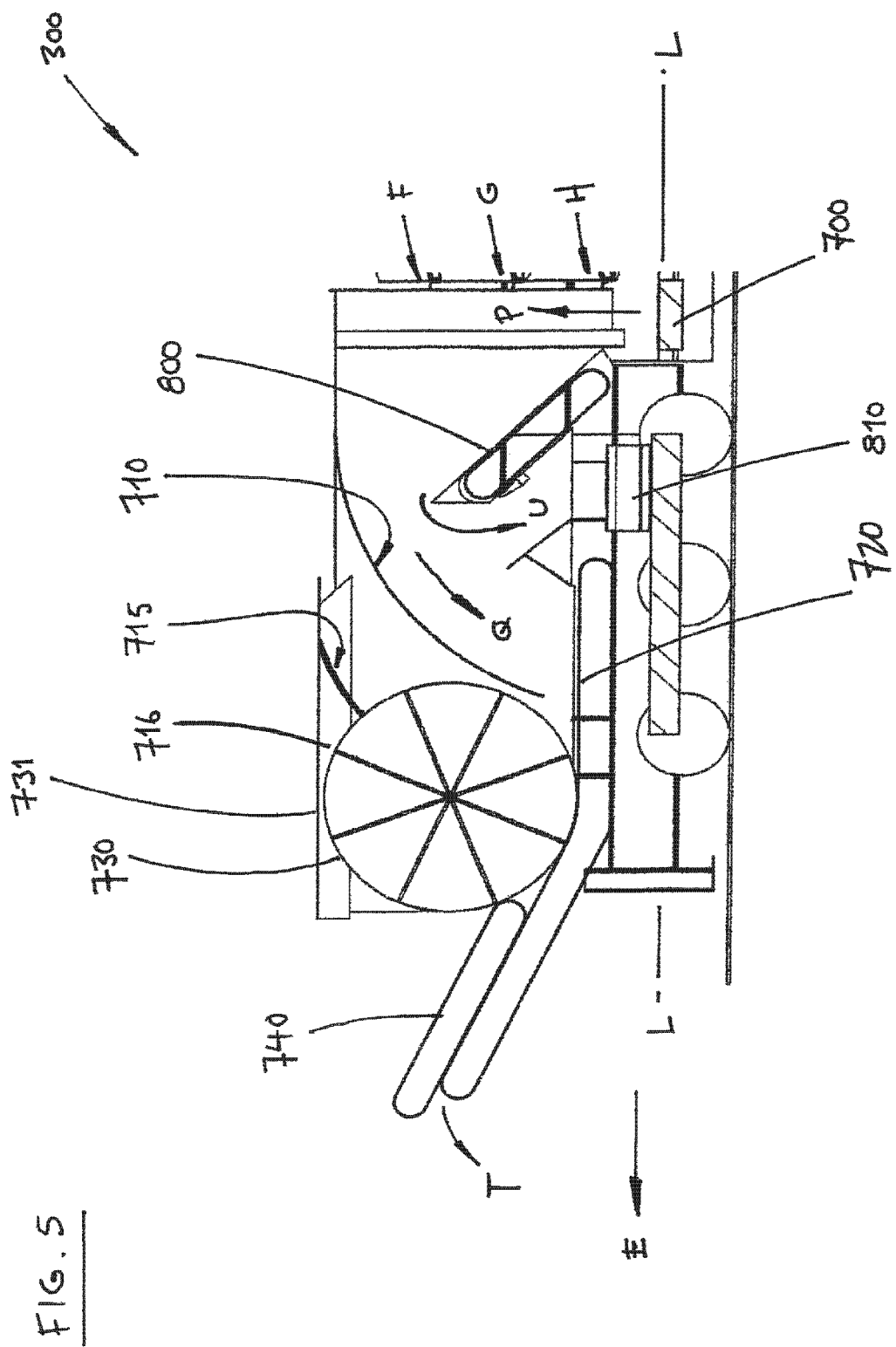

FIG. 5 is a sectional view of the third section 300 of the apparatus while FIG. 6 is a perspective view from the opposite side. Waste flows F, G, H from the second section of the apparatus are passed through multiple high-velocity vertically-directed air jets or 'knives' P generated by a fan, blower, compressor or similar to further assist separation of material into lighter/heavier fractions. The use of multiple jets ensures redundancy for the event that one of the jets is blocked, e.g., by a piece of waste. Similar 'knives' (not shown) may be arranged under the top plate of the screen 'box' or housing and at the back.

As indicated by arrow Q, high SSA items such as paper and plastic are blown along the surface of a curved guide 710 and then crushed between a conveyor belt 720 and a roller 730 which is supported on the belt 720 by at least one swing arm such that the roller is driven by the belt. Roller 730 is perforated to allow the through-flow of air, the perforations having a diameter of around 10 mm. Curved guide 710 comprises bars (not shown) that extend transversely to the longitudinal axis LL in the manner of the rungs of a hamster wheel. The bars/rungs may be spaced by about 25 mm. A secondary guide screen 715 (not shown in FIG. 6), located to the rear of guide 710 when viewed in the feed direction F, reduces the chances of any waste that may pass through guide 710 becoming jammed in the nip 716 between wheel 730 and housing 731. The crushed waste material is then conveyed in compacted form between the belt 720 and an upper belt 740 to the end of the belts where it is ejected (e.g., into a skip) as indicated by arrow T. Low SSA items, by contrast, are conveyed up elevator 800 from the top of which they are deposited as indicated by arrow U onto a conveyor belt 810 extending transversely to the apparatus axis LL.

It should be understood that this invention has been described by way of examples only and that a wide variety of modifications can be made without departing from the scope of the invention.

INCORPORATION BY REFERENCE

The entire content of each document listed below is incorporated by reference into this document (the documents below are collectively referred to as the "incorporated documents").

Priority Patent Documents Incorporated by Reference:
Int'l Pat. Pub. No. WO 2017/198980 (App. No. PCTGB2016/053253), titled "Sorting Waste Materials," filed on 19 Oct. 2016, published on 23 Nov. 2017.

The invention claimed is:

1. Apparatus for sorting mixed waste materials, comprising:
   a first sieve screen having upper and lower surfaces and first sieve openings configured to allow only the waste materials having a maximum dimension less than or equal to a first threshold dimension to pass therethrough;
   a second sieve screen having upper and lower surfaces and second sieve openings configured to allow only the waste materials having a maximum dimension less than or equal to a second threshold dimension to pass therethrough, the second threshold dimension being less than the first threshold dimension; and
   a third surface;

wherein each of the first and second sieve screens have an inlet end configured to receive waste materials and an outlet end configured to discharge at least some of the waste materials received at the inlet end that do not pass through the respective sieve screen;

wherein the apparatus is configured such that the waste materials passing through the first sieve screen fall under gravity towards the upper surface of the second sieve screen and the waste materials passing through the second sieve screen fall under gravity towards the third surface; the apparatus being further configured to generate:

a first gas stream between the lower surface of the first sieve screen and the upper surface of the second sieve screen and configured to drive off volatile contaminants from the waste materials passing through the first sieve screen, the first gas stream having a first velocity;

a second gas stream between the lower surface of the second sieve screen and the third surface and configured to drive off volatile contaminants from the waste materials passing through the second sieve screen, the second gas stream having a second velocity that is less than the first velocity; and one or more additional gas streams at the outlet ends of the first and second sieve screens, the one or more additional gas streams being vertically directed through the waste materials discharged at the outlet ends of the first and second sieve screens to assist separation thereof.

2. Apparatus according to claim 1, wherein the first gas stream is configured to have a first velocity such that substantially all the waste materials having a maximum dimension equal to the first threshold dimension reach the upper surface of the second screen.

3. Apparatus according to claim 1, wherein the second gas stream is configured to have a second velocity such that substantially all the waste materials having a maximum dimension equal to the second threshold dimension reach the third surface.

4. Apparatus according to claim 1 comprising a fan configured to generate the first and second gas streams.

5. Apparatus according to claim 4 including dampers configured to control the velocities of the first and second gas streams.

6. Apparatus according to claim 5 wherein the apparatus is configured to simultaneously vary the velocities of both the first and the second gas streams.

7. Apparatus according to claim 6 wherein the fan is a variable-speed fan located upstream of the dampers.

8. Apparatus according to claim 7 wherein the apparatus is configured to vary the velocity of a gas stream leaving the variable-speed fan by a factor of up to five.

9. Apparatus according to claim 8 wherein the apparatus is configured to vary the velocity of the first gas stream in a range from about 4 m/s to about 24 m/s.

10. Apparatus according to claim 1 wherein the apparatus is configured to compact at least one fraction of sorted waste.

11. Apparatus according to claim 10 comprising a roller configured to compact at least one fraction of sorted waste.

12. Apparatus according to claim 11, wherein the roller bears upon a driven conveyor belt.

13. Apparatus according to claim 12, wherein the roller is driven by the driven conveyor belt.

14. Apparatus according to claim 1, further comprising: a housing which supports the first and second sieve screens; and a vibration generator configured to vibrate the housing.

15. Method of sorting mixed waste materials, the method comprising:

providing mixed waste materials;

sieving on a first sieve screen the mixed waste materials so as to produce first particles having a maximum dimension less than or equal to a first threshold dimension;

passing the first particles through a first gas stream having a first velocity so as to drive off volatile contaminants;

sieving on a second sieve screen the first particles so as to produce second particles having a maximum dimension less than or equal to a second threshold dimension;

passing the second particles through a second gas stream having a second velocity that is less than the first velocity, so as to drive off volatile contaminants;

discharging the mixed waste materials which do not pass through the first and second sieve screens through respective outlet ends of the first and second sieve screens; and vertically directing one or more additional gas streams through the waste materials discharged at the respective outlet ends of the first and second sieve screens.

* * * * *